US010222080B2

(12) United States Patent
Saiki et al.

(10) Patent No.: US 10,222,080 B2
(45) Date of Patent: Mar. 5, 2019

(54) AIR PURIFIER

(71) Applicant: Mitsubishi Electric Corporation, Tokyo (JP)

(72) Inventors: Ayumi Saiki, Tokyo (JP); Sota Komae, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 151 days.

(21) Appl. No.: 15/026,629

(22) PCT Filed: Oct. 3, 2014

(86) PCT No.: PCT/JP2014/076601
§ 371 (c)(1),
(2) Date: Apr. 1, 2016

(87) PCT Pub. No.: WO2015/060107
PCT Pub. Date: Apr. 30, 2015

(65) Prior Publication Data
US 2016/0245543 A1   Aug. 25, 2016

(30) Foreign Application Priority Data

Oct. 22, 2013  (WO) ................. PCT/JP2013/078595

(51) Int. Cl.
*F24F 3/16*   (2006.01)
*F24F 11/30*  (2018.01)
(Continued)

(52) U.S. Cl.
CPC .......... *F24F 11/30* (2018.01); *B01D 53/0407* (2013.01); *F24F 3/166* (2013.01);
(Continued)

(58) Field of Classification Search
CPC ............ B01D 46/0023; B01D 46/0032; B01D 46/10; B01D 46/54; B01D 2267/40;
(Continued)

(56) References Cited

U.S. PATENT DOCUMENTS 5,428,345 A * 6/1995 Bruno .................. G08B 13/04
                                                    340/521
8,231,718 B2 * 7/2012 Cho .................... B01D 46/0089
                                                    422/121
(Continued)

FOREIGN PATENT DOCUMENTS

CN   101251277 A   8/2008
CN   101839539 A   9/2010
(Continued)

OTHER PUBLICATIONS

Office Action dated Apr. 4, 2017 issued in corresponding JP patent application No. 2015-543780 (and partial English translation).
(Continued)

*Primary Examiner* — Duane Smith
*Assistant Examiner* — Minh-Chau Pham
(74) *Attorney, Agent, or Firm* — Posz Law Group, PLC

(57) ABSTRACT

An air purifier capable of reducing time required for purification of a room without giving a feeling of discomfort to a human in the room is provided. During operation of an air purifier 1, air drawn from an inlet 3 into a casing 2 is purified by a purification device 7 and the air is blown to the outside from an outlet 4. If a user of the air purifier 1 selects a particular operation mode in which the user designates an air volume, a control device 12 performs air volume maintaining control. In the air volume maintaining control, with a volume of air blown out from the outlet 4 by the air blowing device 5 maintained constant, a speed of the air is varied by an air guiding device 8 based on a status of pollutant detection. Alternatively, the speed of the air is varied by the air guiding device 8 and the volume of the air is varied by the air blowing device 5. Consequently, a dust removal efficiency can be enhanced without giving a feeling of being blown by air to a human in a room, enabling reduction of time required for purification of the room while maintaining user comfort.

9 Claims, 6 Drawing Sheets

(51) Int. Cl.
*F24F 13/14* (2006.01)
*B01D 53/04* (2006.01)
*F24F 11/79* (2018.01)
*F24F 11/77* (2018.01)
*F24F 11/75* (2018.01)
F24F 110/50 (2018.01)
F24F 110/64 (2018.01)
F24F 120/10 (2018.01)
F24F 110/30 (2018.01)

(52) U.S. Cl.
CPC .............. *F24F 11/75* (2018.01); *F24F 11/77* (2018.01); *F24F 11/79* (2018.01); *F24F 13/1413* (2013.01); *B01D 2257/90* (2013.01); *B01D 2257/91* (2013.01); *F24F 2003/1628* (2013.01); *F24F 2003/1635* (2013.01); *F24F 2003/1646* (2013.01); *F24F 2003/1685* (2013.01); *F24F 2110/30* (2018.01); *F24F 2110/50* (2018.01); *F24F 2110/64* (2018.01); *F24F 2120/10* (2018.01); *Y02A 50/25* (2018.01)

(58) Field of Classification Search
CPC . B01D 2273/14; B01D 2273/30; B03C 3/011; B03C 3/36; B03C 3/16; F24F 3/16; F24F 13/28; Y02B 30/78
USPC ........ 55/482, 309, 385.2, DIG. 34; 95/8, 90, 95/63, 287; 96/134, 111, 55, 417, 19; 340/541, 521, 528
See application file for complete search history.

(56) References Cited

U.S. PATENT DOCUMENTS

2004/0118276 A1* 6/2004 Kim .................. B01D 46/0023
                                                           95/8
2009/0042502 A1* 2/2009 Kim ..................... B60H 3/0071
                                                           454/139
2012/0031983 A1  2/2012 Shirota et al.
2012/0137876 A1* 6/2012 Miller ................ B01D 46/0043
                                                           95/23
2016/0114278 A1* 4/2016 Yu ...................... B01D 46/0086
                                                           55/473

FOREIGN PATENT DOCUMENTS

| CN | 102235734 A | 11/2011 |
|----|-------------|---------|
| JP | S61-38778 B2 | 8/1986 |
| JP | S63-82143 U | 5/1988 |
| JP | 05-280804 A | 10/1993 |
| JP | 2854615 B2 | 11/1998 |
| JP | 2004-020002 A | 1/2004 |
| JP | 2009-250596 A | 10/2009 |
| JP | 2012-037087 A | 2/2012 |
| JP | 2012-097955 A | 5/2012 |
| JP | 2013-000459 A | 1/2013 |
| WO | 2015/059770 A1 | 4/2015 |

OTHER PUBLICATIONS

Office Action dated Oct. 11, 2016 for the corresponding JP application No. 2015-543780 (and partial English translation).
Office action dated Feb. 2, 2018 issued in corresponding CN patent application No. 201480058292.2 (and English translation thereof).
International Preliminary Report on Patentability dated May 6, 2016 for the corresponding international application No. PCT/JP2013/078595.
International Preliminary Report on Patentability dated May 6, 2016 for the corresponding international application No. PCT/JP2014/076601.
Office action dated Jul. 19, 2018 issued in corresponding CN patent application No. 201480058292.2 (and English machine translation thereof).
Office Action dated Apr. 18, 2017 issued in corresponding AU patent application No. 2014338218.
Office Action dated May 17, 2016 issued in corresponding TW patent application No. 103136100 (and partial English translation).
Office Action dated Oct. 4, 2016 issued in corresponding TW patent application No. 103136100 (and partial English translation).
International Search Report of the International Searching Authority dated Dec. 22, 2014 for the corresponding international application No. PCT/JP2014/076601 (and English translation).

* cited by examiner

AIR PURIFIER

CROSS REFERENCE TO RELATED APPLICATIONS

This application is a U.S. national stage application of International Application No. PCT/JP2014/076601 filed on Oct. 3, 2014, and is based on and claims priority to International Application No. PCT/JP2013/078595 filed on Oct. 22, 2013, the disclosures of which are incorporated by reference.

FIELD

The present invention relates to an air purifier having a function that purifies drawn air and blows the air out.

BACKGROUND

As a conventional technique, for example, the air purifier described in Patent Literature 1 is known. The air purifier according to the conventional technique includes means for detecting a concentration of pollutants contained in air and means for controlling a volume of air blown out. The air purifier monitors the concentration of pollutants while circulating air in a room, and thereby catches a pollution source and changes a fan operation level (blown air volume) to reduce time required for purification of the room.

As another conventional technique, for example, the air purifier described in Patent Literature 2 is known. The air purifier detects a human existing in a room and controls a direction of blowing of air so that the air does not blow onto the human. Consequently, the other convention technique prevents air blown from the air purifier from giving a feeling of discomfort to a human.

CITATION LIST

Patent Literature

Patent Literature 1: Japanese Patent No. 2854615
Patent Literature 2: Japanese Patent Publication No. 61-38778

SUMMARY

Technical Problem

The aforementioned conventional technique described in Patent Literature 1 employs control in which an amount of air blown is controlled by changing a fan operation level and the air is selectively blown out in a direction toward a pollution source to remove pollutants. However, this control has the problem of increasing an amount of airflow circulating in a room and the airflow being blown onto a human in the room, giving a feeling of discomfort to the human.

On the other hand, the conventional technique described in Patent Literature 2 prevents a human in a room from having a feeling of discomfort because a direction of blowing of air is controlled so as to prevent the air from blowing onto the human, but has the problem of time required for purification of the room being increased by an amount required for blowing the air while avoiding the human.

The present invention has been made in order to solve the aforementioned problems, and an object of the present invention is to provide an air purifier capable of reducing time required for purification of a room without giving a feeling of discomfort to a human in the room.

Solution to Problem

An air purifier of the invention comprises a casing including an air inlet and an air outlet, an air blowing device for drawing air from the inlet into an inside of the casing and blowing the air out from the outlet, a purification device for purifying the air flowing inside the casing, an air guiding device capable of varying a flow passage area for airflow generated inside the casing, using the air blowing device, and a control device for controlling the air blowing device and the air guiding device.

Advantageous Effects of Invention

This invention enables enhancing a dust removal efficiency without giving a feeling of being blown by air, to a human in a room. Therefore, this invention enables reducing time required for purification of the room while maintaining user comfort.

DESCRIPTION OF EMBODIMENTS

Figure 1:
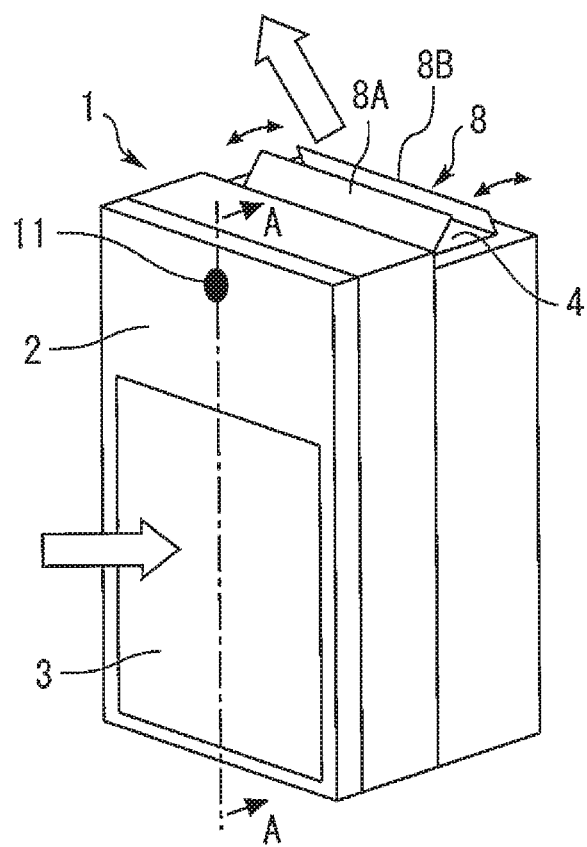
FIG. 1 is a perspective diagram illustrating an air purifier according to Embodiment 1 of the present invention.

Embodiments of the present invention will be described below. In the drawings used in the present description, components that are common to the drawings are provided with a same reference numeral, and overlapping description thereof will be omitted.

Embodiment 1

Figure 2:
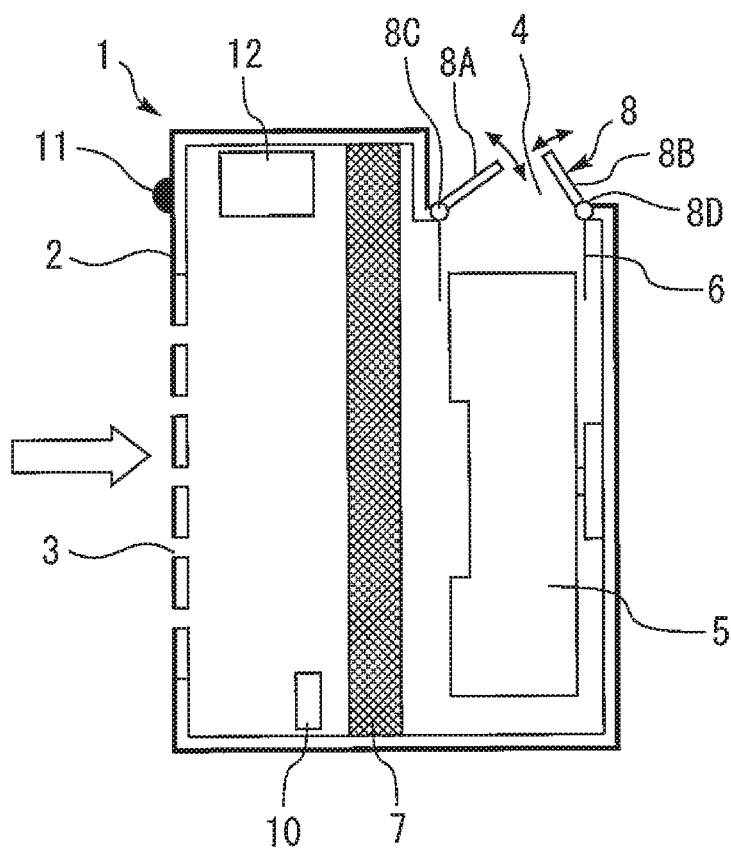
FIG. 2 is a vertical cross-sectional diagram illustrating an air purifier cut along line A-A indicated by arrows in FIG. 1.
Figure 3:
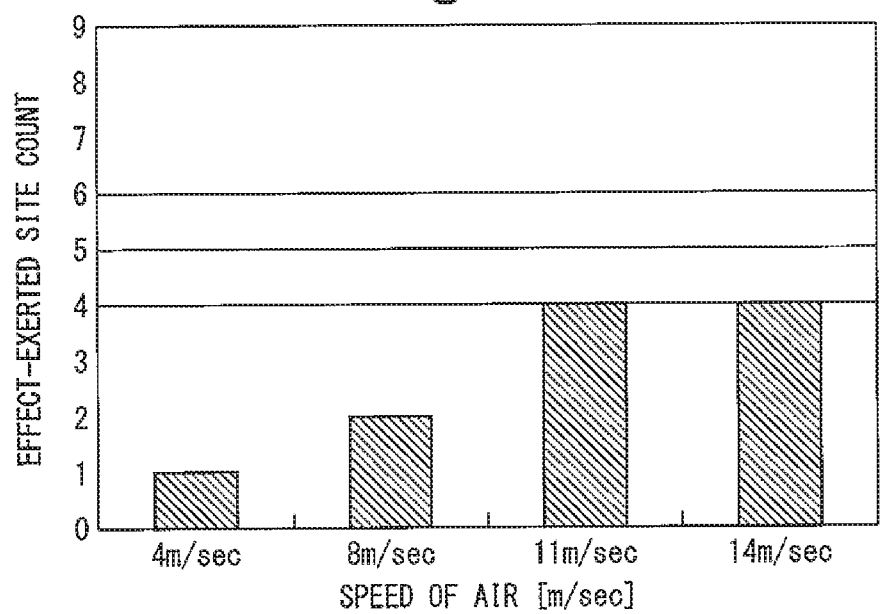
FIG. 3 illustrates test data indicating a relationship between air speed and dust removal efficiency with an air volume of the air purifier maintained constant in Embodiment 1 of the present invention.

FIGS. 1 to 3 illustrate Embodiment 1 of the present invention. FIG. 1 is a perspective diagram illustrating an air purifier according to Embodiment 1 of the present invention, and FIG. 2 is a vertical cross-sectional diagram illustrating an air purifier cut along line A-A indicated by arrows in FIG. 1. As illustrated in these figures, an air purifier 1 according to the present embodiment includes, e.g., a casing 2, an inlet 3, an outlet 4, an air blowing device 5, a purification device 7, an air guiding device 8 and a control device 12. Here, the air purifier 1 is installed, for example, at a position close to any of wall surfaces of a room, and is made to operate with a rear face portion of the casing 2 facing the relevant wall surface and a front face portion of the casing 2 facing the room space.

The casing 2 is formed in, for example, a quadrangular box shape, and inside the casing 2, e.g., the air blowing device 5, the purification device 7 and the control device 12 are housed. In the front face portion of the casing 2, an inlet 3 for drawing room air into the casing 2 is provided, and in an upper face portion of the casing 2, an outlet 4 for blowing out the air drawn into the casing 2 is provided. The outlet 4 is formed as, for example, an elongated quadrangular opening portion, and extends horizontally as viewed from the front of the casing 2. Therefore, two long sides of an opening end of the outlet 4 having a rectangular shape face each other in a front-rear direction of the casing 2.

The air blowing device 5 is intended to draw air from the inlet 3 into the casing 2 and blow out the air from the outlet 4, and includes, for example, an electrical fan. The blow-out side of the air blowing device 5 is connected to the outlet 4 via an air passage 6. The air passage 6 includes, e.g., a duct having a rough cylindrical shape, and is intended to introduce air blown from the air blowing device 5 into the outlet 4 and prevent the air from leaking to the inside of the casing 2. Here, inside the casing 2, besides the air passage 6, a flow straightening structure that straightens airflow generated by the air blowing device 5 may be provided.

The purification device 7 is intended to purify air drawn into the casing 2 by the air blowing device 5, and is disposed between the draw-in side of the air blowing device 5 and the inlet 3. Air drawn into the casing 2 passes through the purification device 7 and thereby purified and then is blown out from the outlet 4. Here, "purification or purify" refers to removal of, for example, pollutants suspended in air such as dust, smoke, viruses, bacteria, mold, allergens and odorous molecules, and more specifically, means an action of collecting, inactivating or absorbing and decomposing these pollutants. For the purification device 7, for example, a filter that filtrates air, a voltage application device that generates a high electrical field or active oxygen between electrodes to remove pollutants, or a mechanism including a combination of the voltage application device and the filter is used.

The air guiding device 8 is intended to vary the flow passage area for airflow generated inside the casing 2 by the air blowing device 5, and more specifically varies the area of the opening of the outlet 4. The air guiding device 8 includes a set of (two) movable bodies 8A and 8B, and drive units 8C and 8D. The movable bodies 8A and 8B are formed by, for example, rectangular flat plates each having a dimension that is similar to that of the outlet 4 in a horizontal direction of the casing 2 and extend over an entire length of the outlet 4. The proximal end side of each of the movable bodies 8A and 8B, which is one long side, is swingably attached to a position corresponding to the opening end of the outlet 4 in the casing 2. Also, the distal end side of each of the movable bodies 8A and 8B, which is another long side, projects to a position that allows the relevant movable body 8A or 8B to cover the opening of the outlet 4, that is, a position that allows the relevant movable body 8A or 8B to interrupt the flow passage for airflow.

One movable body 8A of the movable bodies 8A and 8B is attached to a part on the front side of the opening end of the outlet 4 and the other movable body 8B is attached to a part on the rear side of the opening end of the outlet 4. In other words, the movable bodies 8A and 8B of the set are disposed so as to face each other across a flow passage for airflow blown from the outlet 4, in the front-rear direction of the casing 2. On the other hand, the drive units 8C and 8D are mechanisms that drive the respective movable bodies 8A and 8B and each include, e.g., a non-illustrated motor.

The air guiding device 8 swings at least one of the movable bodies 8A and 8B using the drive units 8C and 8D, enabling the flow passage area for airflow to be varied according to the swung position(s) of the movable body 8A and/or the movable body 8B. In this case, the distal end sides of the movable bodies 8A and 8B are swung so as to move close to and away from each other, whereby the area of a flow passage formed between the distal end sides is varied. Also, the air guiding device 8 swings the movable bodies 8A and 8B asymmetrically, enabling a direction in which air is blown out from the outlet 4 to be turned vertically between a forward direction and an upward direction. In the below description, a direction of blow-out of air relative to a vertical direction is referred to as "a blow-out angle".

With the above-described air guiding device 8, the movable bodies 8A and 8B of the set are moved close to and away from each other or are swung asymmetrically, enabling the flow passage area and the blow-out angle of airflow blown from the outlet 4 to be varied. Therefore, a mechanism capable of varying the flow passage area and the blow-out angle can be provided by a simple configuration using a set of movable bodies 8A and 8B.

Next, a control system in the air purifier 1 according to the present embodiment will be described. The air purifier 1 includes a sensor system including a pollutant detection device 10 and an outer detection device 11, and a control device 12. The pollutant detection device 10 is intended to detect an amount of pollutants in air blown into the casing 2, and is disposed, for example, on the upstream side of the purification device 7 inside the casing 2. Also, the pollutant detection device 10 includes, for example, a composite-type sensor including a combination of e.g., a dust sensor, a gas sensor and an air speed sensor.

Here, the dust sensor includes, e.g., a semiconductor element and an optical element, and detects a concentration of dust in air. The gas sensor includes, e.g., a semiconductor element, and detects harmful gases such as odorous molecules and VOCs. The air speed sensor includes, e.g., an ultrasonic element, and converts a variation in air speed into a current value. Results of detection by these sensors are output from the pollutant detection device 10 to the control device 12. Here, the aforementioned combination of the respective sensors is a mere example, and the pollutant detection device 10 in the present invention is not limited to the pollutant detection device 10 provided by the combination of the respective sensors mentioned above.

The outer detection device 11 is intended to detect an installation environment of the air purifier 1, and is provided, for example, on the front face portion of the casing 2. Also, the outer detection device 11 includes a composite-type sensor including a combination of, e.g., an obstacle sensor, a moving body sensor, a thermograph and a humidity sensor, and includes a movable mechanism (not illustrated) capable of changing a direction of object detection. Here, the obstacle sensor includes, e.g., an optical sensor, an ultrasonic sensor and an image recognition sensor, and detects, e.g., whether or not there is any obstacle in the room and a distance to a wall surface (that is, the size of the room). The moving body sensor includes, e.g., an optical sensor and a temperature sensor, and detects a variation in, e.g., illuminance or temperature and thereby catches a motion of a human, an animal or the like.

The thermograph can distinguish between humans and animals and obstacles, which are non-living objects, based on temperatures. Also, an output of the humidity sensor is used for correcting sensitivities of the respective sensors according to a humidity of the air. In the outer detection device 11, also, the aforementioned combination of the respective sensors is a mere example, and the outer detection device 11 in the present invention is limited to the outer detection device 11 including the aforementioned combination of the respective sensors. More specifically, the outer detection device 11 may include at least one detection device from among a human detection device that detects a human in a room, an obstacle detection device that detects an obstacle in a room and a size detection device that detects a size of a room.

The control device 12 is intended to control a state of operation of the air purifier 1 including those of the air blowing device 5 and the air guiding device 8, and includes, e.g., an arithmetic processing unit, input/output ports and a storage circuit, which are not illustrated. The sensor system is connected to the input side of the control device 12, and actuators including, e.g., the air blowing device 5 and the drive units 8C and 8D of the air guiding device 8 are connected to the output side of the control device 12. The control device 12 drives the actuators based on outputs of the sensor system and thereby actuates the air purifier 1.

Next, operation of the air purifier 1 according to the present embodiment will be described. Upon actuation of the air purifier 1, the control device 12 drives the air blowing device 5, the air guiding device 8 and the sensor system. Consequently, air is drawn into the casing 2 from the inlet 3, and the air is purified by the purification device 7 and is then blown out to the outside from the outlet 4 via the air blowing device 5 and the air passage 6. At this time, the control device 12 detects information relating to, e.g., a room size and obstacles using the sensor system. This information includes information relating to a distance to a furthest wall surface inside the room.

Based on the information, the control device 12 swings the movable bodies 8A and 8B using the drive units 8C and 8D of the air guiding device 8 to adjust a blow-out angle of the air blown out from the outlet 4, and adjusts a frequency of rotation of a fan mounted in the air blowing device 5. Consequently, the blow-out angle and a volume of the air blown out from the outlet 4 are controlled to provide an optimum state according to the room size and the obstacles. An example of the optimum state is that the control device 12 makes air be blown out obliquely upward on the front side from the outlet 4. The air hits a part of a ceiling at a position close to the wall surface that is furthest from the air purifier 1 and then goes down along the wall surface and further returns to the position of the air purifier 1 along a floor surface, whereby the air circulates around the entire room. As described above, the blow-out angle and the volume of air are controlled based on information relating to the inside of the room, which enables purifying air blown out from the outlet 4 while circulating the air throughout the room. Accordingly, the room air can efficiently be purified in a short period of time.

(Air Volume Maintaining Control)

If a user of the air purifier 1 selects a particular operation mode (e.g., a silent mode) in which the user designates an air volume, air volume maintaining control is performed by the control device 12. The air volume maintaining control is control to be performed to, using the air guiding device 8, vary a speed of air blown out from the outlet 4 based on, e.g., a status of pollutant detection, with a volume of the air maintained constant. For a specific example, in the air volume maintaining control, first, a target rotation frequency of the air blowing device 5 (that is, the fan) is determined based on, e.g., the air volume designated by the user and an actual rotation frequency of the air blowing device 5 is maintained to be equal to the target rotation frequency.

In the air volume maintaining control, with the rotation frequency of the air blowing device 5 maintained constant, an amount of pollutants in air drawn into the casing 2 is detected by the pollutant detection device 10. Then, if the amount of pollutants is no less than a prescribed value set in advance, the movable bodies 8A and 8B of the air guiding device 8 are moved close to each other, whereby the flow passage area for airflow blown out from the outlet 4 is decreased. This processing enables increasing the speed of the air blown out from the outlet 4 while maintaining the amount and direction of the air constant. Consequently, pollutants can be made to promptly reach the inlet 3 together with the airflow circulating in the room. Accordingly, the pollutant purification efficiency can be enhanced while maintaining the air volume designated by the user.

Also, if the amount of pollutants detected is decreased to be less than the prescribed value as a result of the aforementioned processing, the movable bodies 8A and 8B are moved away from each other to increase the flow passage area for the airflow blown from the outlet 4 to an original state (state before detection of the amount of pollutants, the amount being no less than the prescribed value). This processing enables returning a speed of air blown out from the outlet 4 to an original state without varying a volume and a direction of the air. Accordingly, a duration of processing for air speed increase can be minimized.

(Human Avoiding Control)

On the other hand, if a user selects a human avoiding mode, human avoiding control is performed by the control device 12. The human avoiding control is control to be performed to, using the movable bodies 8A and 8B of the air guiding device 8, control a blow-out angle of air blown out from the outlet 4 to prevent the air from blowing onto a human. During performance of the human avoiding control, the aforementioned processing for increasing/decreasing the flow passage area for airflow blown out from the outlet 4 according to the amount of pollutants detected using the movable bodies 8A and 8B may be performed simultaneously.

Next, effects provided by the control according to the present embodiment will be described with reference to FIG. 3. FIG. 3 illustrates test data indicating a relationship between air speed and dust removal efficiency with an air volume of the air purifier maintained constant in Embodiment 1 of the present invention. The test data are data obtained as a result of actuating the air purifier 1 in a test room in which dusts were generated and counting the number of sites at which a dust removal effect was obtained from among nine sites in the test room (effect-exerted site count). An effect-exerted site count is defined as the number of sites at which a dust removal speed is no less than a certain standard in a state in which a constant air volume that prevents a human from having a feeling of discomfort when air blows onto the human (feeling of being blown by air) and a desired air speed is provided. Also, the test data indicate variation in effect exerted site count when the air speed is varied to each of four levels using the air guiding device 8 with the air volume maintained constant.

From the test data illustrated in FIG. 3, it can be seen that as the speed of the air blown out from the outlet 4 is increased, the effect exerted site count increases. As described above, with the air volume maintaining control, a speed of blown air is increased with the volume of the air maintained constant, enabling enhancement in dust removal efficiency without giving a feeling of being blown by the air to a human in a room. Accordingly, time required for purification of a room can be reduced while maintaining user comfort. In Embodiment 1, the air volume maintaining control indicates a specific example of air volume maintaining control means.

Embodiment 2

Figure 4:
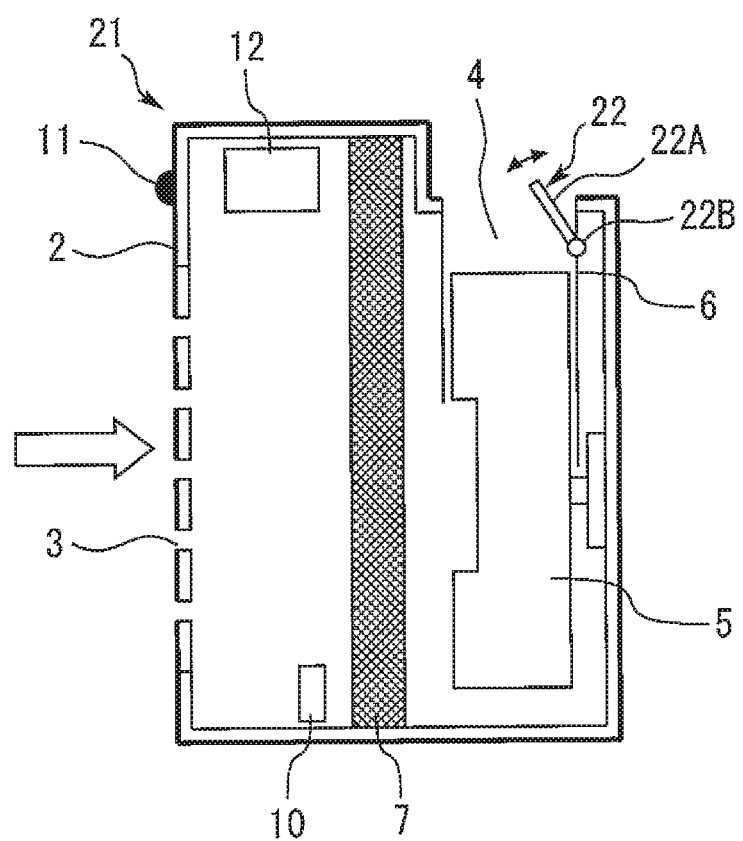
FIG. 4 is a vertical cross-sectional diagram illustrating an air purifier according to Embodiment 2 of the present invention.

Next, Embodiment 2 of the present invention will be described with reference to FIG. 4. FIG. 4 is a vertical cross-sectional diagram illustrating an air purifier according to Embodiment 2 of the present invention. As illustrated in this figure, an air purifier 21 according to the present embodiment is configured in such a manner that is similar to Embodiment 1 described above, and includes an air guiding device 22. However, the air guiding device 22 includes one movable body 22A attached to a part on the rear side of an opening end of an outlet 4 and a drive unit 22B that swings the movable body 22A, and no movable body is disposed at a part on the front side of the opening end of the outlet 4.

The present embodiment configured as described above also enables varying the flow passage area for airflow blown out from the outlet 4 according to a swung position of the movable body 22A, and thus can provide effects that are substantially similar to those of Embodiment 1. More specifically, the air guiding device 22 swings the movable body 22A so as to be tilted forward to decrease the flow passage area. Also, the movable body 22A is swung so as to be erected upward, enabling increase in the flow passage area. Also, a flow straightening mechanism that straightens air in conjunction with the air guiding device 22 may be provided in parts such as the outlet 4 and an air passage 6.

Embodiment 3

Figure 5:
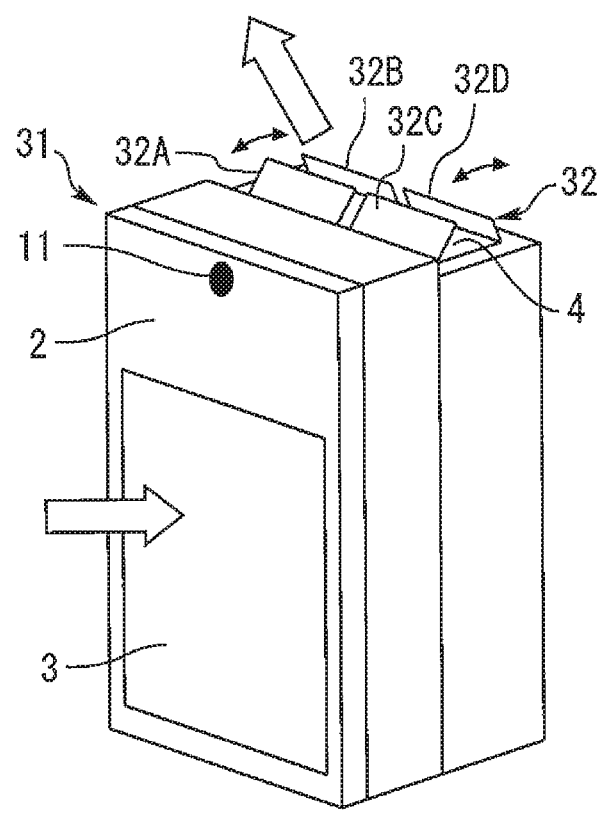
FIG. 5 is a perspective diagram illustrating an air purifier according to Embodiment 3 of the present invention.

Next, Embodiment 3 of the present invention will be described with reference to FIG. 5. FIG. 5 is a perspective diagram illustrating an air purifier according to Embodiment 3 of the present invention. As illustrated in this figure, an air purifier 31 according to the present embodiment is configured in such a manner that is substantially similar to Embodiment 1, and includes an air guiding device 32. However, the air guiding device 32 includes two sets of (four) movable bodies including movable bodies 32A and 32B and movable bodies 32C and 32D, and drive units (not illustrated) that swings the respective movable bodies 32A, 32B, 32C and 32D.

Each of the movable bodies 32A, 32B, 32C and 32D is formed by, for example, a rectangular flat plate having a length dimension that is half a length of the outlet 4 in a horizontal direction of a casing 2. The movable bodies 32A and 32C are swingably attached to a part on the front side of the opening end of the outlet 4 and are disposed side by side in a length direction of the outlet 4. The other movable bodies 32B and 32D are swingably attached to a part on the rear side of the opening end of the outlet 4, and are disposed side by side in the length direction of the outlet 4. Here, the length direction of the outlet 4 is a direction perpendicular to a flow direction of airflow blown out from the outlet 4, and corresponds to the horizontal direction of the casing 2.

In other words, the two sets of the movable bodies 32A and 32B and the movable bodies 32C and 32D are disposed in parallel relative to the flow direction of airflow blown out from the outlet 4. The movable bodies 32A and 32B of one set are disposed across a left half part of an entire flow passage of airflow blown out from the outlet 4 as viewed from the front, and face each other in a front-rear direction of the casing 2. These movable bodies 32A and 32B can be swung close to and away from each other or swung asymmetrically, by means of the respective drive units. Also, the movable bodies 32C and 32D of the other set are disposed across a right half of the flow passage as viewed from the front, and face each other in the front-rear direction. These movable bodies 32C and 32D can also be swung by means of the respective drive units in such a manner that is similar to the movable bodies 32A and 32B.

According to the present embodiment configured as described above, respective flow passage areas and blow-out angles at a plurality of parts in a cross-section of a flow passage of airflow blown out from the outlet 4 can individually be varied. In other words, the air purifier 31 can vary a speed and a blow-out angle of airflow blown from the left half part of the outlet 4 using the movable bodies 32A and 32B and vary a speed and a blow-out angle of airflow blown out from the right half part of the outlet 4 using the movable bodies 32C and 32D. Accordingly, in addition to the effects that are substantially similar to those of Embodiment 1, air can be blown out in a plurality of directions from the outlet 4 and an air speed can be made to differ depending on the direction, enabling further precise control of airflow in a room.

In Embodiment 3 described above, the four movable bodies 32A, 32B, 32C and 32D may be swung by different drive units, or the movable bodies 32A and 32C or the movable bodies 32B and 32D, which are arranged side by side, may be swung by a common drive unit.

Embodiment 4

Figure 6:
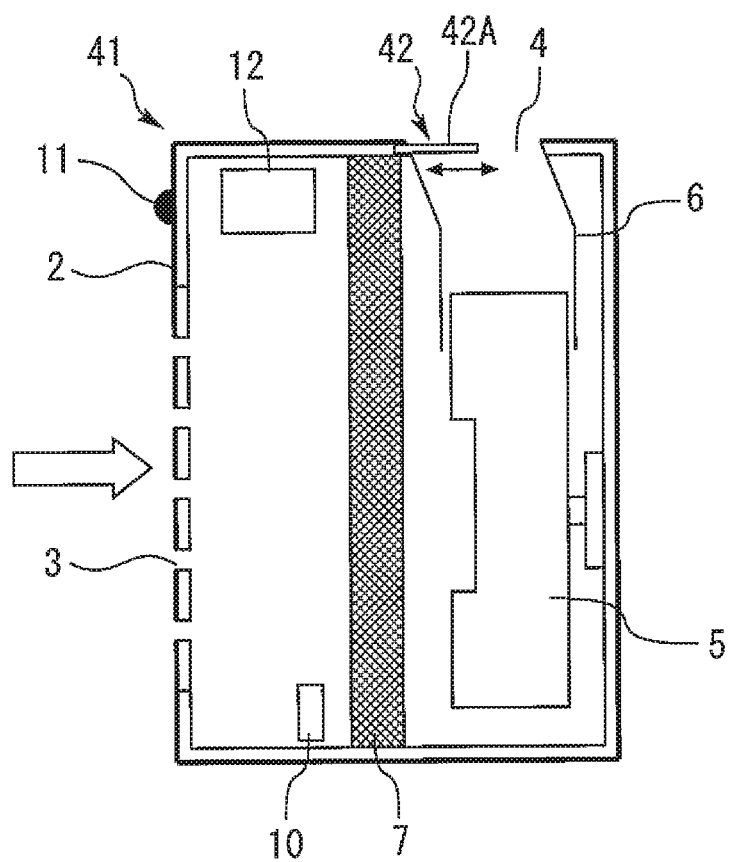
FIG. 6 is a vertical cross-sectional diagram illustrating an air purifier according to Embodiment 4 of the present invention.

Next, Embodiment 4 of the present invention will be described with reference to FIG. 6. FIG. 6 is a vertical cross-sectional diagram illustrating an air purifier according to Embodiment 4 of the present invention. As illustrated in this figure, an air purifier 41 according to the present embodiment is configured in such a manner that is substantially similar to Embodiment 1 described above, and includes an air guiding device 42. However, the air guiding device 42 includes a sliding movable body 42A and a drive unit (not illustrated) that slides the movable body 42A.

The movable body 42A includes, for example, a flat plate or the like, and has a length dimension that is similar to that of an outlet 4 in a horizontal direction of the casing 2. Also, the movable body 42A is fitted in, e.g., a groove formed in the vicinity of an opening end of the outlet 4 and is slidable in a direction in which the movable body 42A advances and withdraws perpendicularly to a flow passage of airflow blown out from the outlet 4 (for example, a front-rear direction of the casing 2). When the movable body 42A slides in a direction in which the movable body 42A advances to the flow passage of the airflow, the area of the opening of the outlet 4, that is, the area of the flow passage of the airflow blown out from the outlet 4 decreases and a speed of the air increases. Also, when the movable body 42A slides in a direction in which the movable body 42A withdraws from the flow passage of the airflow, the area of the opening of the outlet 4 increases and the speed of the air thus decreases.

In the present embodiment configured as described above, also, a control device 12 controls a drive unit to slide the movable body 42A, enabling varying the flow passage area according to a slide position of the movable body 42A. Accordingly, effects that are similar to those of Embodiment 1 above can be provided.

Embodiment 3 described above employs a configuration in which two sets of the movable bodies 32A and 32B and the movable bodies 32C and 32D are arranged in parallel relative to a flow direction of airflow blown out from the outlet 4. However, the present invention is not limited to this configuration, and three or more sets of movable bodies may be arranged in parallel relative to a flow direction of airflow.

Likewise, each of Embodiments 2 and 4 described above may employ a configuration in which two or more sets of movable bodies 22A and 42A are arranged in parallel relative to a flow direction of airflow.

Embodiment 5

Figure 7:
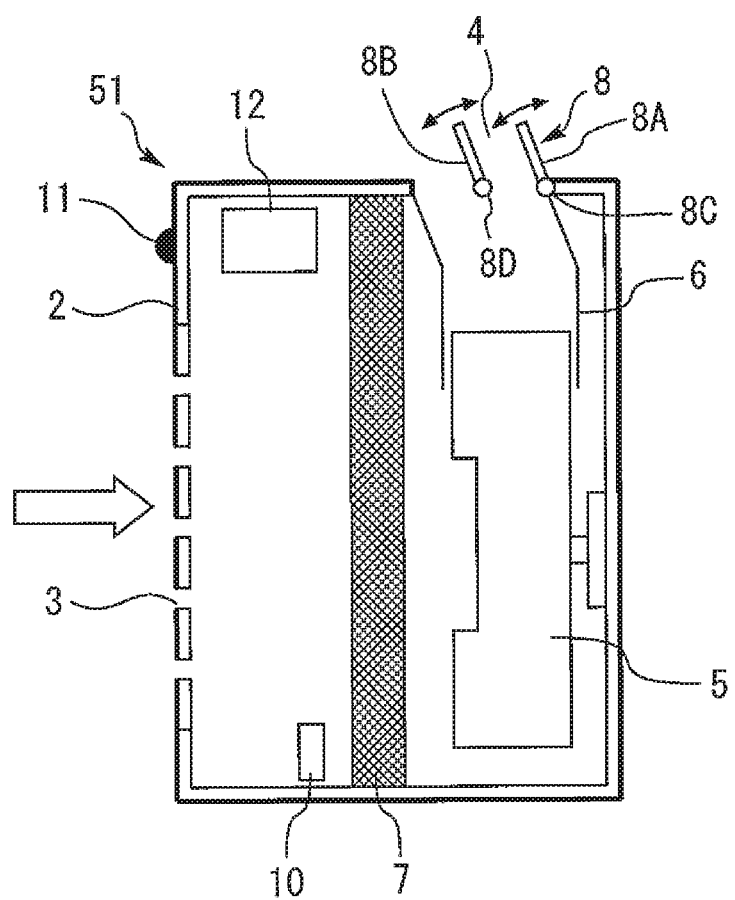
FIG. 7 is a vertical cross-sectional diagram illustrating an air purifier according to Embodiment 5 of the present invention.

Embodiment 1 above has been described in terms of a configuration in which the movable bodies 8A and 8B included in the air guiding device 8 are attached to the front and rear parts of the outlet 4 and the movable bodies 8A and 8B are made to face each other. However, the present invention is not limited to this configuration, and, for example, as illustrated in FIG. 7, each of movable bodies 8A and 8B may be attached in such a manner that an opening is provided on the front side of the movable body. FIG. 7 is a vertical cross-sectional diagram illustrating an air purifier according to Embodiment 5 of the present invention. As illustrated in this figure, in the air purifier 51 according to the present embodiment, the movable body 8A is disposed at a part on the rear side of the outlet 4 and the movable body 8B is disposed at a part in the outlet 4. These movable bodies 8A and 8B are driven independently from each other by the respective drive units 8C and 8D as in Embodiment 1.

According to the present embodiment, the area of the outlet 4 can be partly interrupted by either of the movable bodies 8A and 8B and the area of the flow passage can be reduced by the amount of the interrupted area. Consequently, a speed of air blown out from the outlet 4 can be increased, enabling reduction in time required for room air purification. The present embodiment has been described taking a case where the air guiding device 8 includes two movable bodies 8A and 8B as an example. However, the present invention is not limited to this example, and, for example, the air guiding device 8 may include three or more sets of movable bodies which are arranged side by side in a front-rear direction. Also, in the present invention, two or more movable bodies may be arranged side by side in a horizontal direction, and in this case, also, effects that are similar to those of Embodiment 5 can be provided.

Also, although Embodiments 1 to 5 have been described taking the individual configurations as respective examples, the present invention is not limited only to these individual configurations. In other words, in the present invention, for example, a single air purifier can be provided by a combination of a plurality of configurations that can be combined from among the configurations of Embodiments 1 to 4. For a specific example, in the present invention, Embodiments 1 and 4 may be combined to provide a configuration in which the sliding movable body 42A is disposed at each of the front side and the rear side of the outlet 4 to vary the area of the opening of the outlet 4 from both sides.

Embodiment 6

(Air Volume Variable Control)

Although in Embodiment 1, description on air volume maintaining control has been provided, in Embodiment 6, air volume variable control in which an air volume is variable is performed. In the air volume variable control, for example, an air speed may be varied together with an air volume according to an amount of pollutants detected by a pollutant detection device 10. For a specific example of this control, if the amount of pollutants detected is no less than a reference value set in advance, an volume of air blown out from an air blowing device 5 is increased and a speed of air blown out from the outlet 4 is increased by an air guiding device 8. The above-described air volume variable control enables time required for room air purification to be reduced by an amount corresponding to an increase in volume of blown air.

On the other hand, in the air volume variable control, if the amount of pollutants detected becomes less than the reference value as a result of room air purification, the volume of air blown out is returned to an original amount. In other words, the volume of air blown out is reduced to an air volume before start of the air volume variable control. As a result, the air volume variable control enables time during which an air volume is increased to be reduced to a minimum necessary. Accordingly, time during which a user has a feeling of being blown by a large volume of air is reduced, enabling enhancement of user comfort. Here, the air volume variable control described in Embodiment 6 can be provided in any of the air purifiers 1, 21, 31, 41 and 51 illustrated in Embodiments 1 to 5.

REFERENCE SIGNS LIST 1, 21, 31, 41, 51 air purifier, 2 casing, 3 inlet, 4 outlet, 5 air blowing device, 6 air passage, 7 purification device, 8, 22, 32, 42 air guiding device, 8A, 8B, 22A, 32A, 32B, 32C, 32D, 42A movable body, 8C, 8D, 22B drive unit, 10 pollutant detection device, 11 outer detection device, 12 control device

The invention claimed is:

1. An air purifier comprising:
a casing including an air inlet and an air outlet;
an air blowing device for drawing air from the inlet into an inside of the casing and blowing the air out from the outlet;
a purification device for purifying the air flowing inside the casing;
an air guiding device including a plurality of sets of movable bodies, each set of movable bodies including at least two movable bodies facing each other across a flow passage of airflow blown out from the outlet of the casing to an outside of the casing, wherein the air guiding device is capable of varying a flow passage area and a blow-out direction of the airflow by the at least two movable bodies swinging close to each other and away from each other, and wherein the sets are located downstream of the air blowing device; and
a control device for controlling the air blowing device and the air guiding device, wherein
the outlet is formed as an elongated quadrangular opening,
the sets are disposed side by side in a length direction of the outlet, and
each movable body is individually swung, whereby the flow passage areas of a plurality of parts in a cross section of the flow passage of the airflow are varied.

2. The air purifier according to claim 1, wherein the the movable bodies are disposed side by side in a direction perpendicular to a flow direction of the airflow.

3. The air purifier according to claim 1, wherein each set of the movable bodies closes a part of the outlet, whereby the flow passage area is varied.

4. The air purifier according to claim 1, wherein the control device varies a speed of air blown out from the outlet by the air blowing device, using the air guiding device, with a volume of the air maintained constant.

5. The air purifier according to claim 1, wherein a volume of the air blown out from the outlet and a speed of the air are varied by the air guiding device.

6. The air purifier according to claim 1 comprising:
a pollutant detection device for detecting an amount of pollutant in air; and air volume maintaining control means for, with a volume of the air blown out from the outlet by the air blowing device maintained constant, varying a speed of the air, wherein the air volume maintaining control means decreases the flow passage area for the airflow using the air guiding device if the amount of pollutant detected by the pollutant detection device is no less than a prescribed value and increases the flow passage area for the airflow if the amount of pollutant is less than the prescribed value.

7. The air purifier according to claim 6, comprising at least one detection device from among a human detection device for detecting a human in a room, an obstacle detection device for detecting an obstacle in the room, and a size detection device for detecting a size of the room, wherein the control device controls a blow-out direction and a volume of air blown out from the outlet based on a result of the detection by the detection device and a result of the detection by the pollutant detection device.

8. An air purifier according to claim 1, wherein the air guiding device varies the flow passage area and the blow-out direction by varying an opening area of the air outlet.

9. An air purifier according to claim 1, wherein the movable bodies are formed by rectangular flat plates.

* * * * *